United States Patent
Harif et al.

(10) Patent No.: US 7,390,152 B2
(45) Date of Patent: Jun. 24, 2008

(54) MILLING HEAD PARTICULARLY USEFUL FOR CUTTING SHARP INTERIOR CORNERS

(75) Inventors: Gershon Harif, Ramat-Gan (IL); Josef Gurievich, 14/3 Savyon Street, Afula (IL) 18789

(73) Assignees: G.R.G. Patents Ltd., Holon (IL); Josef Gurievich, Afula (IL)

( * ) Notice: Subject to any disclaimer, the term of this patent is extended or adjusted under 35 U.S.C. 154(b) by 0 days.

(21) Appl. No.: 11/350,738

(22) Filed: Feb. 10, 2006

(65) Prior Publication Data

US 2007/0189869 A1   Aug. 16, 2007

(51) Int. Cl.
*B23C 1/12* (2006.01)

(52) U.S. Cl. .................. 409/234; 409/201; 409/230; 409/231

(58) Field of Classification Search ................. 409/234, 409/233, 201, 211, 230, 231, 232; 408/238, 408/239 R, 239 A, 240, 124

See application file for complete search history.

(56) References Cited

U.S. PATENT DOCUMENTS

| | | | | |
|---|---|---|---|---|
| 3,699,843 | A * | 10/1972 | Sweeny | 407/9 |
| 3,848,512 | A * | 11/1974 | Erhardt | 407/48 |
| 4,716,657 | A * | 1/1988 | Collingwood | 33/561 |
| 4,981,057 | A * | 1/1991 | von Haas et al. | 82/160 |
| 5,168,609 | A * | 12/1992 | Kojima et al. | 29/27 R |
| 5,237,895 | A * | 8/1993 | Danielsen | 82/160 |
| 5,415,066 | A * | 5/1995 | Erickson et al. | 82/160 |
| 5,697,739 | A * | 12/1997 | Lewis et al. | 409/230 |
| 6,032,350 | A * | 3/2000 | Roeske | 29/558 |
| 6,033,166 | A * | 3/2000 | Hampel | 409/175 |
| 6,530,727 | B2 * | 3/2003 | Harmand et al. | 408/1 R |
| 6,554,551 | B1 * | 4/2003 | Marelli | 409/201 |
| 6,565,497 | B1 * | 5/2003 | Yamazaki et al. | 483/11 |
| 6,746,188 | B2 * | 6/2004 | Watanabe | 409/201 |
| 6,752,750 | B2 * | 6/2004 | Adachi et al. | 483/31 |
| 6,821,063 | B2 * | 11/2004 | Debat et al. | 409/132 |
| 6,825,630 | B2 * | 11/2004 | Katoh et al. | 318/560 |
| 6,840,896 | B2 * | 1/2005 | Endo et al. | 483/30 |
| 6,884,007 | B2 * | 4/2005 | Kress et al. | 407/40 |
| 6,890,133 | B2 * | 5/2005 | Singh et al. | 408/225 |
| 6,976,813 | B2 * | 12/2005 | Shinoda | 409/86 |
| 7,004,693 | B2 * | 2/2006 | Adachi et al. | 409/144 |
| 7,121,773 | B2 * | 10/2006 | Mikiya et al. | 408/5 |
| 7,137,761 | B2 * | 11/2006 | Hara et al. | 408/16 |

* cited by examiner

*Primary Examiner*—Dana Ross (57) ABSTRACT

A milling head particularly useful for cutting sharp interior corners in a workpiece, includes a rotary shaft coupleable to the rotary drive of a milling machine so as to be rotatable about the shaft longitudinal axis; and a conical cutter member coupled to the rotary shaft so as to be rotated thereby about a rotary axis at an angle with respect to the shaft longitudinal axis. Preferably, the conical cutter member defines a cone angle of 70 degrees, and its rotary axis is 55 degrees with respect to the longitudinal axis of the shaft. The conical cutter member is disposed within a case and is aligned with an opening in the case, such that the external surface of the case, engageable with the workpiece, is effective to align the conical cutter member with respect to the surface of the workpiece to be milled, and to enable the conical cutter member to cut sharp internal corners in all three dimensions.

31 Claims, 9 Drawing Sheets

MILLING HEAD PARTICULARLY USEFUL FOR CUTTING SHARP INTERIOR CORNERS

FIELD AND BACKGROUND OF THE INVENTION

The present invention relates to milling heads for milling machines used for machining workpieces, and particularly to milling heads useful for cutting sharp internal corners in workpieces.

Milling machines, both the vertical type and horizontal type, are used for machining workpieces according to a large number of complex operations, such as slotting, planing, drilling, rebating, routing, etc. However, the conventional milling machine is not capable of making certain types of cuts, such as keyways and slots having sharp interior corners, and therefore when such a cutting operation is required, another tool, e.g. a laser tool, is needed for the particular machining operation.

OBJECTS AND BRIEF SUMMARY OF THE PRESENT INVENTION

An object of the present invention is to provide a milling head of a novel construction making it particularly useful for certain cutting operations, such as for cutting sharp internal corners, not capable of being performed by the conventional milling head.

According to a broad aspect of the present invention, there is provided a milling head particularly useful for cutting sharp interior corners in a workpiece, comprising: a rotary shaft coupleable to the rotary drive of a milling machine so as to be rotatable about the shaft longitudinal axis; and a conical cutter member having an external cutting surface of a conical configuration; the conical cutter member being coupled to the rotary shaft so as to be rotated thereby about a rotary axis at an angle with respect to the longitudinal axis of the shaft.

When the milling head is to be used for cutting sharp corners defined by three orthogonal planar surfaces, the external cutting surface of the conical cutter member has a pointed apex and defines a cone angle of about 70 degrees, more precisely 70.52 degrees; and the angle of the conical cutter member axis with respect to the shaft longitudinal axis is the complement of one-half the cone angle, that is 55 degrees, more precisely 54.74°.

According to a further important feature in the preferred embodiments of the invention described below, the milling head further comprises a case rotatably mounting the rotary shaft. The case has at least first and second walls formed with flat external surfaces perpendicularly joined to each other; and the conical cutter member is disposed within the case with the apex of the conical cutter member aligned with an opening through the case at the juncture of the first and second walls of the case. When the outer tip of the apex of the conical cutter member is substantially flush with the outer flat surfaces of the first and second walls of the case at the juncture, the case enables the apex of the conical cutter member to be precisely located at the outer surface of the juncture to enable cutting, in a workpiece, a sharp interior corner in alignment with the juncture.

According to a further feature in some described preferred embodiments, the conical cutter member is adjustably mounted with respect to the rotary shaft and the case to permit the apex of the conical cutter member to be projected a desired distance through the opening in the case. According to still further features in some described preferred embodiments, the external surface of the case is engageable with the workpiece to align the conical cutter member with respect to a surface of the workpiece to be milled.

According to further features in some described preferred embodiments, the case includes a spline projecting from its outer surface and receivable within a groove formed in the workpiece (a) to guide the movement of the conical cutter member parallel to the rotary axis of the rotary shaft, and (b) to prevent rotation of the case when the conical cutter member is moved out of contact with the workpiece. In another described embodiment, the case includes at least one leg projecting outwardly of the third wall and having a flat outer surface flush with one of the first and second walls, such that the leg is effective to perform functions (a) and (b) above, and the further function (c) to facilitate locating the conical cutter member when moved into contact with the workpiece.

In most of the described preferred embodiments, the case is of a hexahedral (six-sided) configuration and has flat external surfaces perpendicular to each other. In another described preferred embodiment, the case is of a cylindrical configuration.

Such a milling head may be constructed as a modular unit for attachment to a conventional milling machine in order to adapt it to perform various types of special cutting operations, such as cutting sharp internal corners, heretofore not possible by conventional milling machines.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

The invention is described below with respect to a number of milling heads constructed in accordance with the invention. It will be appreciated that the constructions described below merely represent several preferred embodiments of the invention, and that the features of the invention, as defined in the appended claims, may be implemented in many other milling head constructions.

Figure 1:
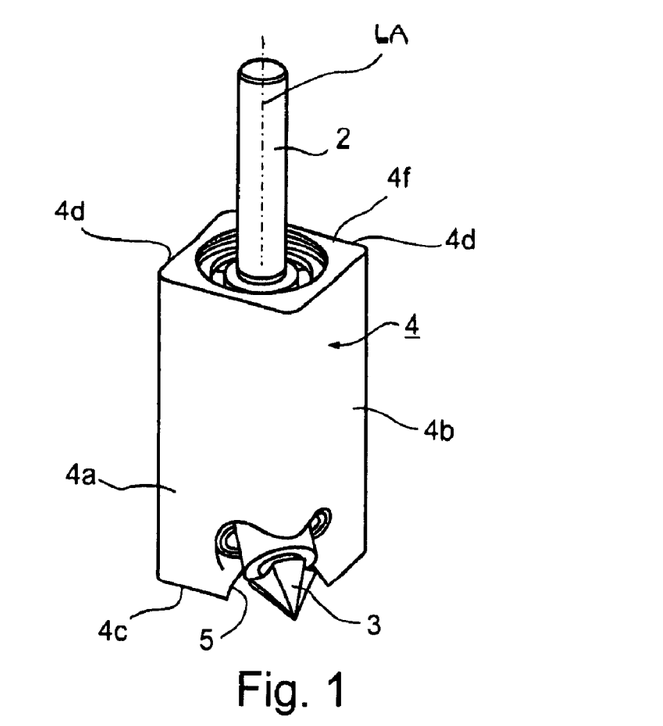
FIG. 1 is a partly broken-away three-dimensional view illustrating one form of milling head constructed in accordance with the present invention.

The basic components of one form of milling head constructed in accordance with the present invention are shown in FIG. 1. Such a milling head includes a rotary shaft 2 couplable to the rotary drive of a drilling machine so as to be rotatable about the shaft longitudinal axis; and a conical cutter member 3 having an external cutting surface of a conical configuration. Conical cutter member 3 is coupled to rotary shaft 2 so as to be rotated thereby about a cutter member rotary axis normally having a predetermined oblique angle with respect to the longitudinal axis of the shaft. The milling head illustrated in FIG. 1 further includes a case 4 rotatably mounting shaft 2 and its conical cutter member 3. Case 4 is formed with an opening 5 aligned with the conical cutter member 3.

As will be described more particularly below, case 4 is preferably of a hexahedral configuration as shown in FIG. 1, constructed of six walls 4a-4f perpendicular to each other, with opening 5 aligned with conical cutter member 3 being at the intersection of three of such perpendicular walls, namely 4a-4c. A further embodiments however, is described below (FIG. 14) wherein the case may be of a cylindrical configuration.

Where the milling head is to be used for cutting sharp internal corners, and the cone angle of the external cutting surface of the conical cutter member is 70 degrees, more precisely 70.52 degrees; and the rotary axis of the conical cutter member is 55 degrees, more precisely 54.74 degrees.

Figure 2A:
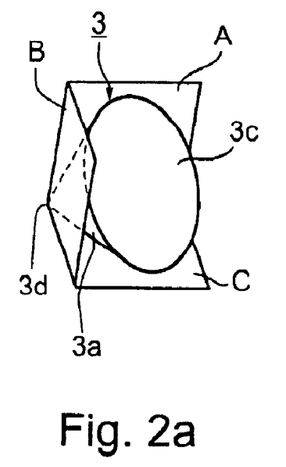
FIGS. 2a, 2b and 2c are three-dimensional, side and plan diagrams, respectively, illustrating the external cutting surface of the conical cutter member of the milling head of FIG. 1; and, FIG. 2d illustrates the manner of computing the optimum angle of the conical cutter member rotary axis with respect to the longitudinal axis of the shaft.
Figure 2B:
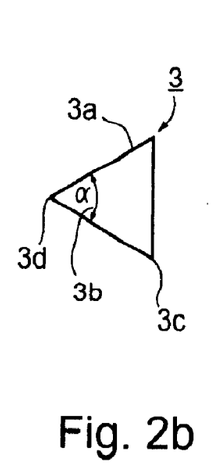
Figure 2C:
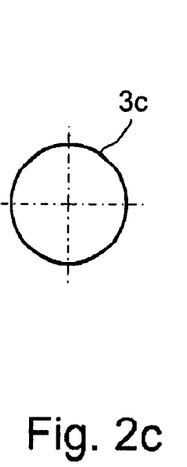
Figure 2D:
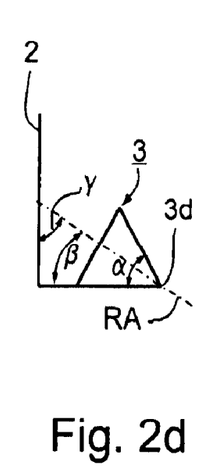

The latter is illustrated by the diagrams of FIGS. 2a-2d. FIG. 2a is a three-dimensional diagram illustrating at 3a the external cutting surface of the conical cutter member 3; FIG. 2b is a side view illustrating at 3b the most-preferred cone angle of the conical cutter member; FIG. 2c is a plan view illustrating at 3c the large-diameter end of the conical cutter member 3; and, FIG. 2d illustrates the manner of computing the optimum angle of the conical cutter member rotary axis with respect to the longitudinal axis of the shaft.

As seen particularly in FIGS. 2a and 2b, when the conical cutter member is formed with a pointed apex 3d for cutting sharp interior corners between planar inner faces A, B and C of a workpiece, the cone angle of the conical cutter member is preferably precisely 70.52 degrees (FIG. 2b) to enable the conical cutter member 3 to cut sharp interior corners at the intersection lines of the three planar surfaces A, B, C. As seen in FIG. 2d, when the cone angle ($\alpha$) of the conical cutter member is 70.52 degrees, its rotary axis defines an angle ($\beta$) with the line normal to the axis of shaft 2 of 35.26 degrees, whereby the angle ($\gamma$) defined by the axis of the conical cutter member (being complementary to $\beta$) is 54.74 degrees.

It will be appreciated that while the above-described parameters are preferred, these parameters can be varied according to the particular application of the milling head. Also, the rotary axis of the conical cutter member may be made adjustable if desired. In some applications it may be perpendicular to the milling head shaft 2.

Figure 3:
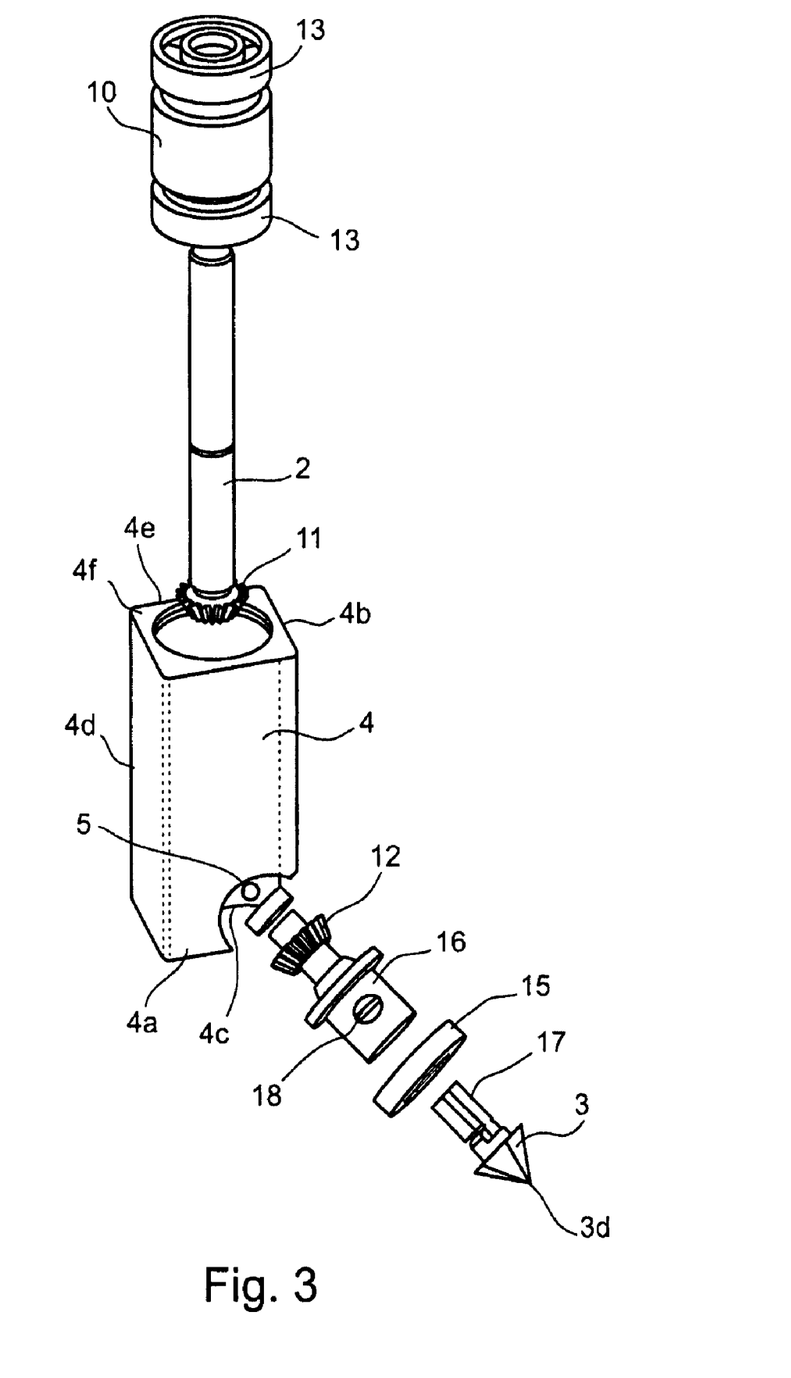
FIG. 3 is an exploded view illustrating the main components in the milling head of FIG. 1.

FIG. 3 illustrates a milling head including the above-described basic components of the milling head of FIG. 1, which basic components have been correspondingly identified by the same reference numerals to facilitate understanding. To these basic components, the milling head illustrated in FIG. 3 further includes: a sleeve 10 coupling the rotary shaft 2 of the milling head to the rotary drive of the milling machine to rotate shaft 2 about its longitudinal axis; a bevel gear 11 at one end of rotary shaft 2: and a bevel gear 12 meshing with bevel gear 11 and coupled to the conical cutter member 3 to rotate it about a rotary axis at a predetermined oblique angle with respect to the rotary axis of shaft 2.

The milling head illustrated in FIG. 3 further includes a pair of bearings 13 for rotatably mounting shaft 2 with respect to sleeve 10; and further bearings 14 and 15 for rotatably mounting bevel gear 12 and cutter member 3 with respect to case 4. Bevel gear 12 is coupled to conical cutter member 3 by a chuck 16 receiving shank 17 of the conical cutter member 3.

As indicated earlier particularly with respect to the diagram of FIG. 2a, cutter member 3 is preferably formed with a sharply-pointed apex (3d, FIG. 2a) aligned with opening 5 in case 4 and flush with the outer surface of the case in order to permit the cutter member to cut sharp internal corners in the workpiece. A milling head constructed in accordance with the present invention, however, may be used in other applications as will be described more particularly below, e.g., wherein the conical cutter member 3 need not have a sharply-pointed apex, and/or need not be flush with the outer surface of the case. For this purpose, FIG. 3 illustrates the chuck 16 of the milling head as including a threaded pin 18 which permits the conical cutter member 3 to be axially adjusted with respect to opening 5 in case 4. Threaded pin also permits a conical cutter member having a sharply-pointed apex to be replaced by a cutter member having another apex, e.g. a rounded or relatively flat apex.

As indicated earlier, case 4 is preferably of a hexahedral configuration, including six sides 4a-4f (FIGS. 1 and 4) all perpendicular to each other. Opening 5 for the conical cutter member 3 is formed in the intersection of the three sides 4a, 4b and 4c, whereas the sixth side 4f, opposite to side 4c, is formed with an opening for receiving the rotary shaft 2 to be coupled to the rotary drive of the milling machine.

Figure 4:
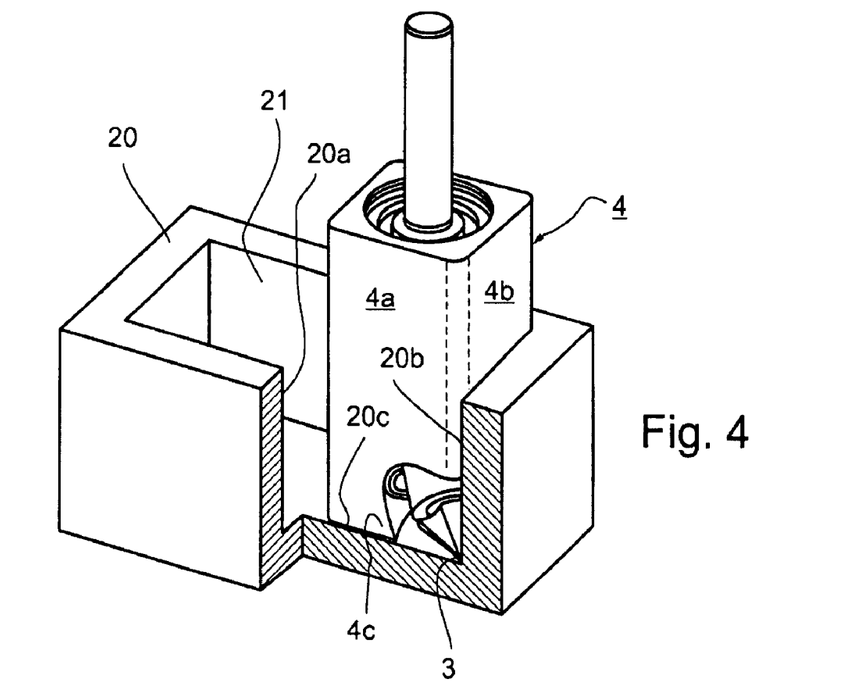
FIG. 4 illustrates one manner of using the milling head of FIG. 1 for cutting a sharp interior corner in a workpiece.

FIG. 4 more particularly illustrates how the milling head of FIGS. 1 and 4 may be used for cutting sharp interior corners in a workpiece 20. Thus, as shown in FIG. 4, by locating case 4 of the milling head within a slot 21 in the workpiece, the rotary cutter member 3 will cut sharp interior corners between the surfaces, shown at 20a-20c, engageable by surfaces 4a-4c, respectively, of the milling head case 4.

Figure 5:
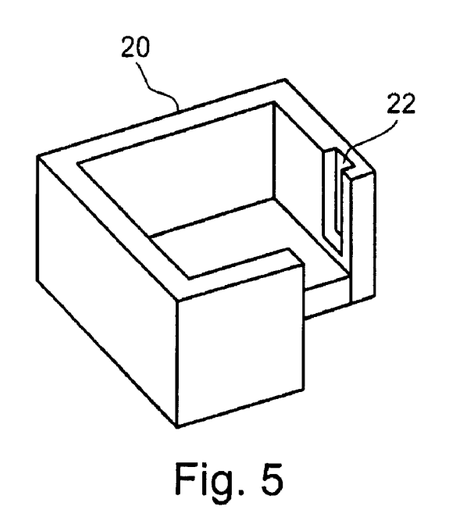
FIG. 5 illustrates a modification in the milling head of FIG. 1, and the manner of using such a milling head for cutting sharp internal corners in a workpiece.
Figure 6:
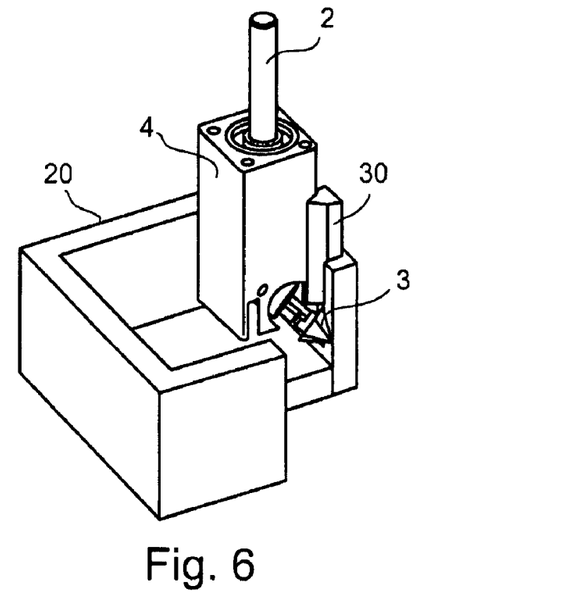
FIG. 6 illustrates the workpiece produced by using the milling head of FIG. 5 in the manner described.

FIGS. 5 and 6 illustrate one manner in which the above-described milling head may also be used for cutting, in a wall of workpiece 20, an internal slot 22 having sharp interior corners. For this purpose a guiding element, in the form of a spline 30 (FIG. 5), may be fixed to the outer surface of case 4 to extend parallel to the longitudinal axis of its rotary shaft 2. Spline 30 may be fixed in axial alignment with the apex of cutter member 3, and may be provided with an external configuration corresponding to that of the finished slot 22 to be formed in workpiece 20. Thus, such a slot may be initially produced by any conventional milling head such that it would not have sharp internal corners. When the slot is to be finished with sharp internal corners, the milling head of FIG. 6 would be applied to the workpiece with spline 30 received within the unfinished slot 22. Thus, effecting relative movement between the case and the workpiece in the direction parallel to the longitudinal axis of rotary shaft 2 would guide the movement of conical cutter member 3 such as to cut sharp internal corners within slot 22.

It will be appreciated that when using the milling head in the manner described with respect to FIG. 5, the apex of the conical cutter member 3 would be projected outwardly of opening 5 in case 4 to be flush with the outer surface of the spline 30, and thereby to cut sharp interior corners in slot 22. Spline 30, when so used, not only guides the movement of the conical cutter member parallel to the rotary axis of shaft 2, but also prevents rotation of the case 4 by the rotating conical cutter when the conical cutter member is moved out of contact with the workpiece.

It will be appreciated that the illustrated milling head could be used without spline 30, but with other guiding and/or rotational-blocking arrangements, such as may be provided in CNC milling machines, for guiding the movement of the milling head with respect to the workpiece and for blocking the rotation of the case when the cutter member disengages the workpiece.

Figure 7:
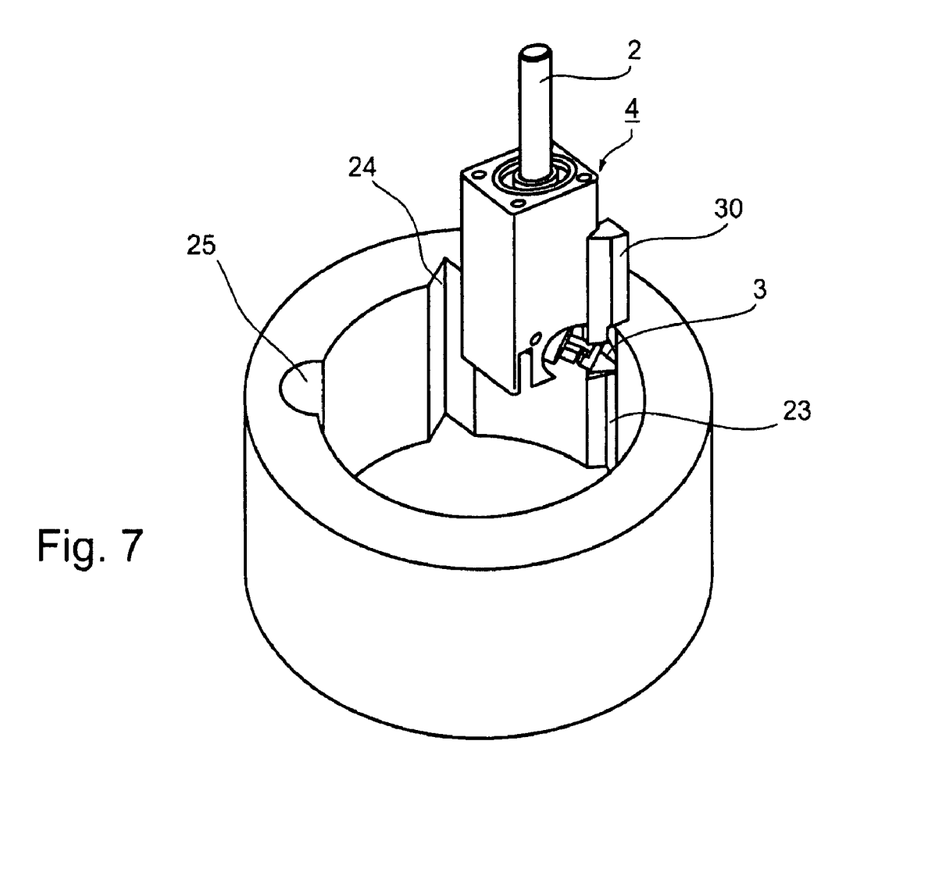
FIG. 7 illustrates another use of the milling head of FIG. 5 for cutting various types of slots in the inner surface of a cylindrical workpiece.

FIG. 7 illustrates the manner of using the above-described milling head, including the spline 30, for cutting sharp internal corners in rectangular slots 23 in the inner surface of a hollow shaft. Thus, when so using the milling head, its conical cutter member 3 would be properly located with its apex in axial alignment with one corner of spline 30, and then in alignment with the other corner of the spline.

FIG. 7 also illustrates how the milling head may also be used to cut V-slots 24 and rounded slots 25 in the inner face of the hollow shaft. When a rounded slot 25 is to be cut, this may be conveniently done by replacing the conical cutter member 3 with one having a rounded apex.

Figure 8:
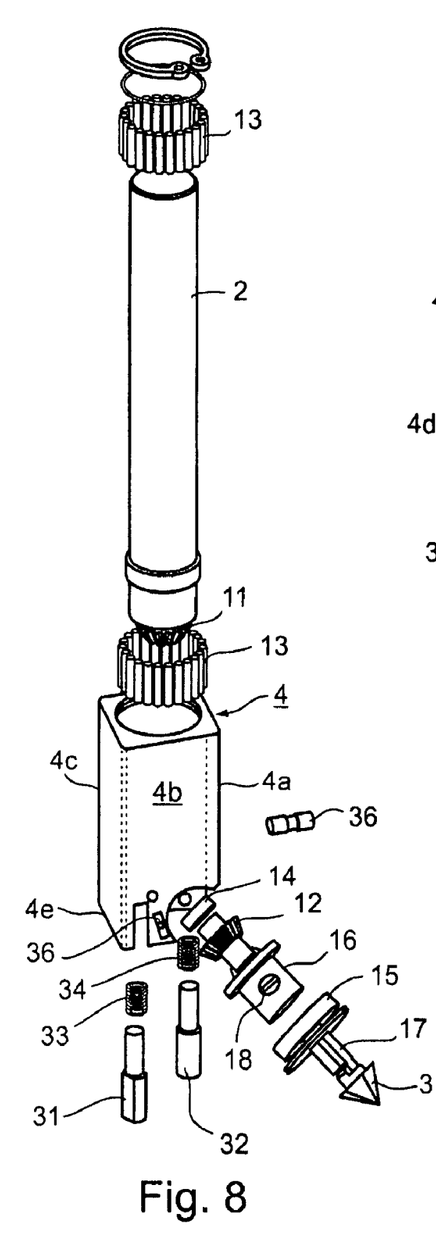
FIG. 8 is an exploded view illustrating another milling head constructed in accordance with the present invention.
Figure 9:
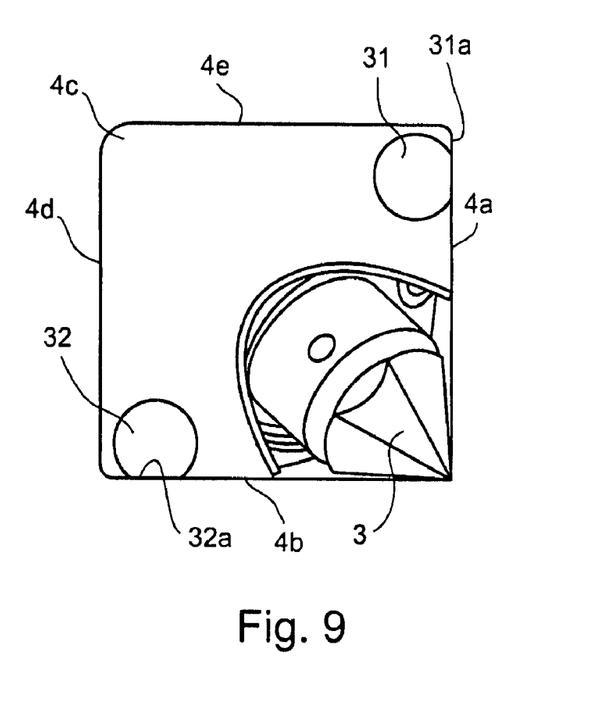
FIG. 9 is a bottom plan view of the milling head of FIG. 8.

FIGS. 8 and 9 illustrate a milling head of the same construction as described above with respect to FIGS. 1-4, except that the milling head is further provided with a pair of legs projecting outwardly of the bottom wall of the case 4 for performing the above described functions of spline 30 of FIGS. 5 and 7, and an additional function particularly advantageous when the milling head is to be used in a CNC-operated milling machine. Thus, the illustrated milling head is provided with two legs 31, 32 projecting outwardly of the bottom wall 4c of case 4. Leg 31 is located adjacent to the intersection of sides 4a and 4e of the case, and includes a flat face 31a flush with the inner flat surface of side 4a of the case. Leg 32 is located adjacent to the intersection of sides 4b and 4d of the case, and includes a flat face 32a flush with the inner flat surface of side 4b.

As shown in FIG. 8, the two legs 31, 32 are telescopically receivable within openings formed in case 4 such as to be moveable to various extended positions with respect to the bottom wall of the case. For this purpose, each of the legs 31, 32 includes a spring 33, 34, biasing the respective leg outwardly of the case, and a threaded pin 35, 36, which may be used for fixing the two legs in a desired extended position according to the particular application. As indicated above, legs 31, 32, when provided in the milling head, are effective to: (a) to guide the movement of the conical cutter member 3 parallel to the rotary axis of the rotary shaft 2, (b) to prevent rotation of the case 4 when the conical cutter member 3 is moved out of contact with said workpiece, and (c) to facilitate locating the conical cutter member 3 when moved into contact with said workpiece.

The foregoing advantages are particularly important when using the milling head with a CNC-operated milling machine. It will be appreciated that some or all of the foregoing advantages are also obtainable when using only a single leg, or when one leg is shorter than the other.

Figures 10, 11, 12:
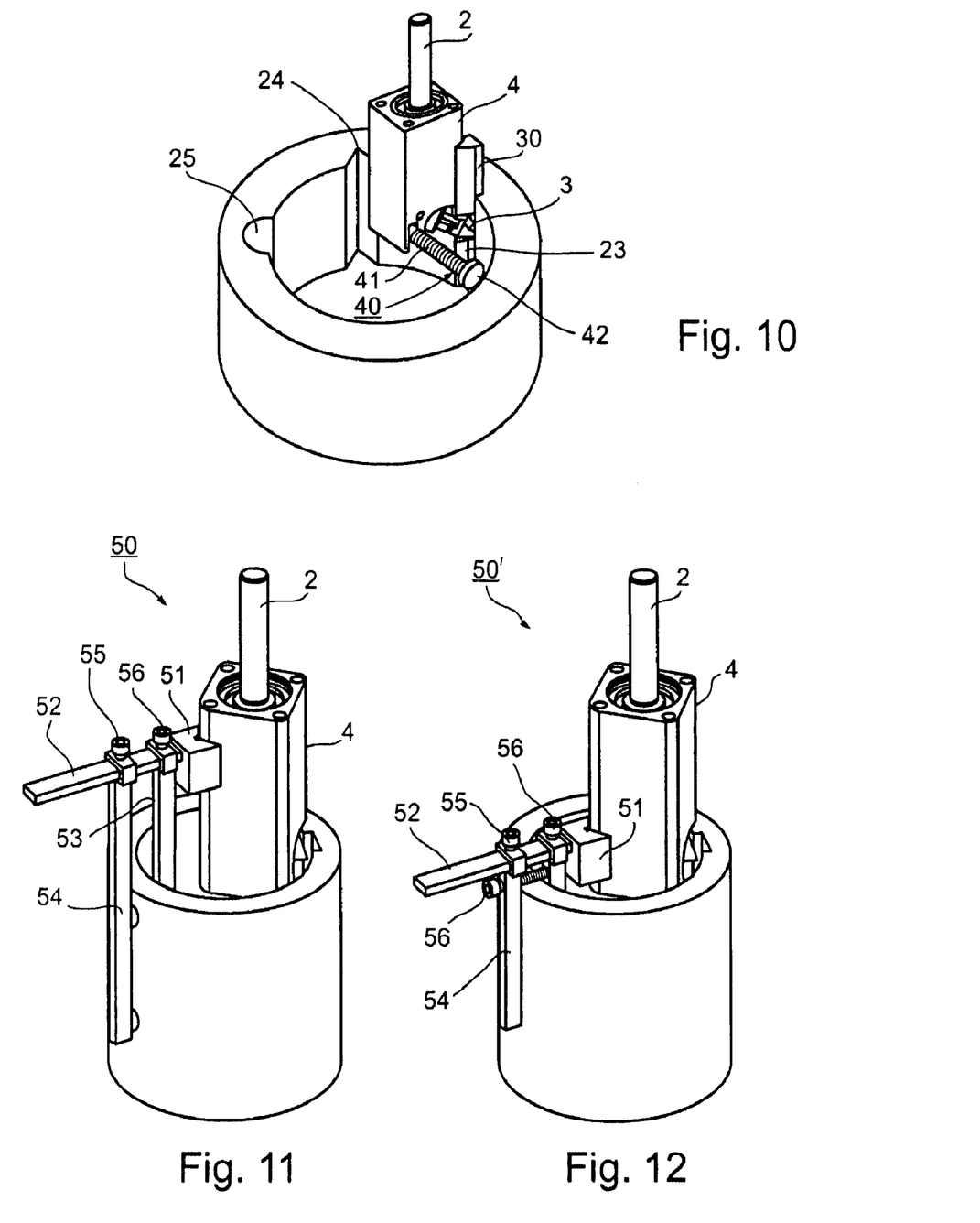
FIG. 10 illustrates a further milling head constructed in accordance with the present invention to include a guiding screw for guiding the movement of the milling head with respect to the workpiece.
FIG. 11 illustrates another milling head constructed in accordance with the present invention including another guiding assembly for guiding the movement of the milling head with respect to the workpiece.
FIG. 12 illustrates a modification in the guiding assembly of FIG. 11.

FIG. 10 illustrates the milling head equipped with another type of guide engageable with a surface of the workpiece for guiding the movement of the conical cutter member 3 with respect to the workpiece. The guide illustrated in FIG. 10 is in the form of a pin 40 having a shank 41 threaded in a wall of the case 4, and an enlarged head 42 engageable with the inner surface of the workpiece, to thereby guide the movement of the milling head, particularly the conical cutter member 3, with respect to the workpiece. The workpiece shown is a hollow shaft or sleeve to be formed with one or more slots 23, 24 or 25 on its inner surface as in FIG. 7.

FIG. 11 illustrates another guiding arrangement for guiding the movement of the milling head with respect to the workpiece. The guiding arrangement illustrated in FIG. 11, therein generally designated 50, includes a mounting member 51 fixed to the upper end of case 4, and mounting a laterally-extending arm 52. Two downwardly-extending feeler arms 53, 54, are adjustably mounted by threaded fasteners 55, 56 lateral to arm 52. Feeler arm 53 is adjustable on lateral arm 52 to engage the inner surface of the workpiece, whereas feeler arm 54 is adjustable on lateral arm 52 to engage the outer surface of the workpiece. Both feeler arms preferably include a pair of contact elements, e.g. 54a, 54b to make point contact with the respective surface of the workpiece.

It will thus be seen that the feeler arms 53, 54, when properly adjusted for the respective workpiece, accurately guide the movement of case 4, and thereby of the conical cutter member 3 therein, with respect to the workpiece.

FIG. 12 illustrates a similar guiding assembly except that the guiding assembly itself is adjustable along the length (height) of case 4 of the milling head. Thus, the guiding assembly illustrated in FIG. 12, and therein designated 50', includes a mounting member 57 adjustably mounted along the length (height) of case 4 of the milling head by the threaded fastener 58. The remainder of guiding assembly 50' illustrated in FIG. 12 is substantially the same as in FIG. 11, and therefore the corresponding elements have been identified with the same reference numerals.

Figure 13:
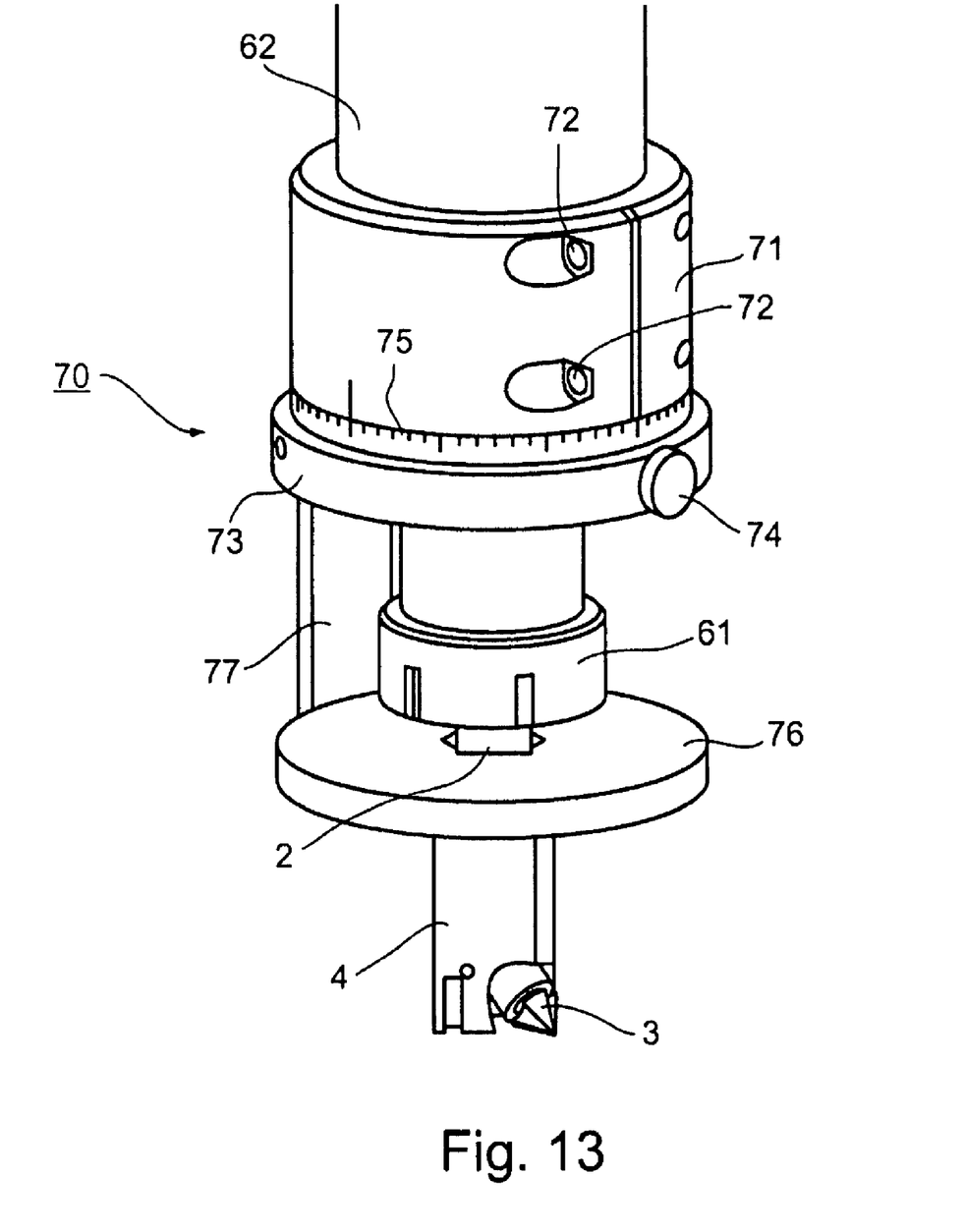
FIG. 13 illustrates another milling head constructed in accordance with the present invention and including a mounting assembly for mounting the milling head to the milling machine in a manner permitting angular adjustment of the milling head with respect to the milling machine.

FIG. 13 illustrates the milling head mounted to the rotary-drive end of the milling machine. In FIG. 13, the rotary-drive end of the milling machine is indicated by its chuck 61, to which the milling head is normally clamped, projecting from a section of the milling machine housing 62 or from any fixed part of the milling machine.

The mounting assembly illustrated in FIG. 13 is generally designated 70. It includes a sleeve 71 fixed to housing section 62 by fasteners or clamping elements 72; and a ring 73 angularly adjustable with respect to sleeve 71 and presettable by a knob 74. The sleeve and/or the ring include graduation markings 75 to indicate the angular position of the ring with respect to the sleeve.

Mounting assembly 70 further includes a disc 76 coupled to ring 73 by coupling member 77 such that the angular position of the disc is indicated by the graduation markings 75.

Housing 4 of the milling head is thus fixed to disc 76. Rotary shaft 2 of the milling head extends through an opening in the disc and is clamped to the milling machine chuck 61. It will thus be seen that the angular position of the milling head case 4, as well as the angular position of the conical cutter member 3 rotatably mounted within the case, are both indicated by the graduation markings 75.

Disc 76 may be preset by ring 74 to any desired position to thereby preset the angular position of case 4 and conical cutter member 3 according to the particular milling operation to be performed. Such positioning of the case and conical cutter member may be done manually, or by machine, e.g. via a CNC machine control, according to the milling operation to be performed.

Figure 14:
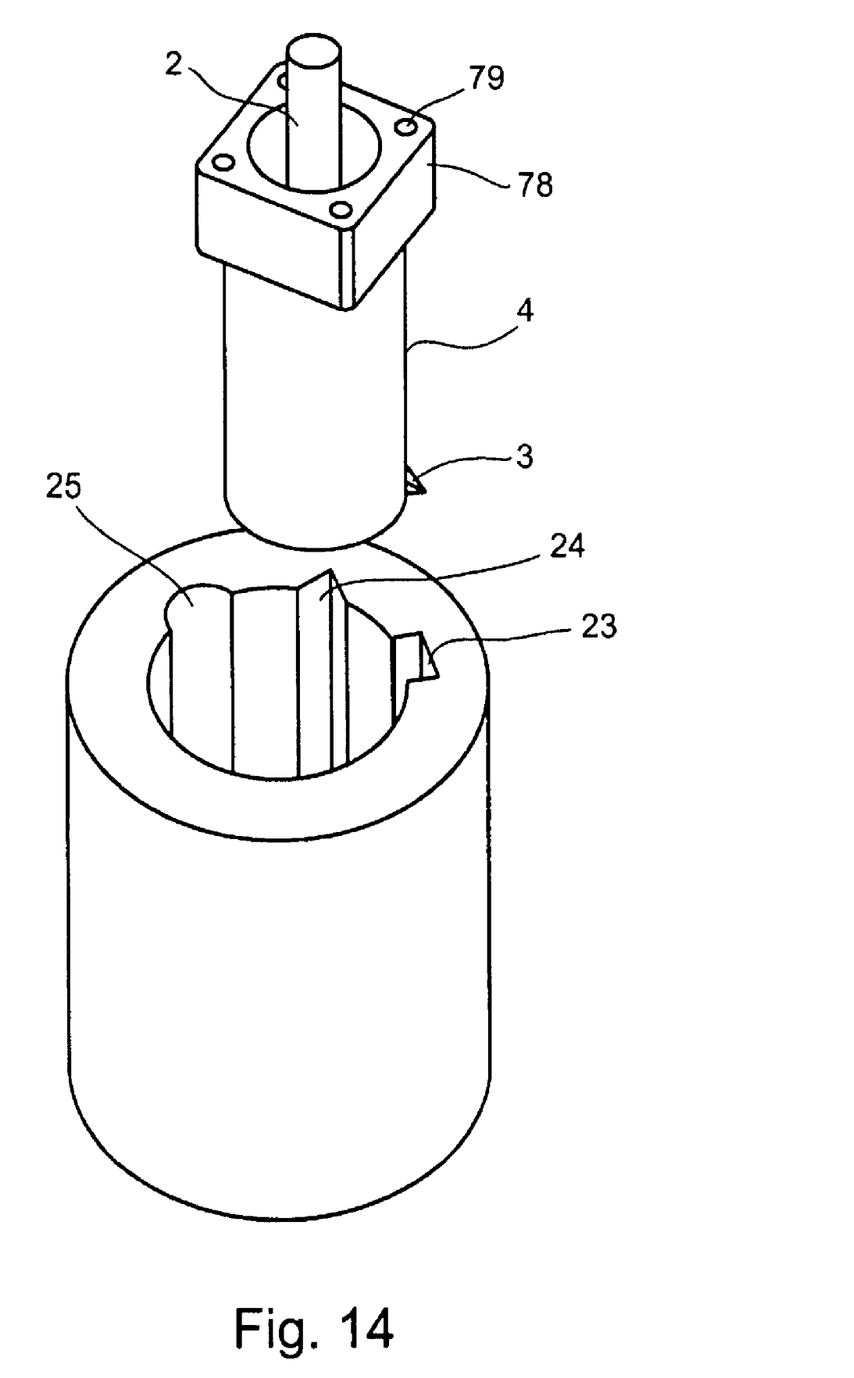
FIG. 14 illustrates another milling head constructed in accordance with the present invention to include a cylindrical case particularly useful for cutting internal slots in hollow shafts.

FIG. 14 illustrates one manner of mounting the case, therein designated 4', of the milling head to angularly-adjustable disc 76, to permit angular adjustment of the case and the conical cutter member 3 rotatably mounted within it. Thus, as shown in FIG. 14, the upper end of case 4' is integrally formed with a flange 78 securable by fasteners 79 to disc 76, with the rotary shaft 2 projecting through the flange for clamping engagement with chuck 61 of the milling machine.

It will be appreciated that the mounting arrangement illustrated in FIG. 14, including the mounting flange 78, may be used for mounting the milling head directly to the rotary-drive end of the milling machine where angular adjustment of the milling head is not needed.

FIG. 14 also illustrates the variation wherein the case 4' of the milling head is not of hexahedral configuration, as in the previously described embodiments, but rather is of a cylindrical configuration. Such a configuration may be desirable where the workpiece is a hollow shaft, such as in FIG. 7 or 10, and one or more slots are to be machined in the inner surface of the hollow shaft. For purposes of example, FIG. 14 illustrates the formation of a rectangular slot 23 with two sharp internal corners, a V-shaped slot 24 also with a single sharp internal corner, and a rounded slot 25. As indicated above, a rounded slot 25 may be formed in the inner surface of the hollow shaft by using a conical cutter member 3 having a rounded apex, rather than a sharply-pointed apex.

Figure 15A:
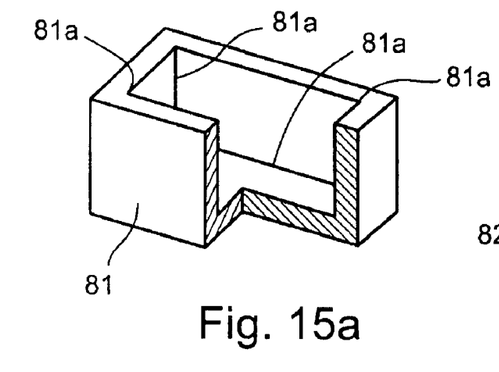
FIGS. 15a-15e illustrate various other types of cutting operations capable of being performed by a milling head constructed in accordance with the present invention.
Figure 15B:
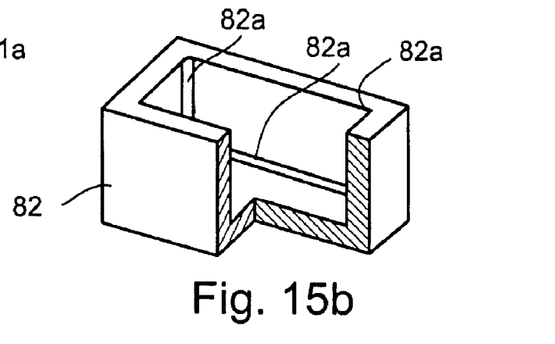
Figure 15C:
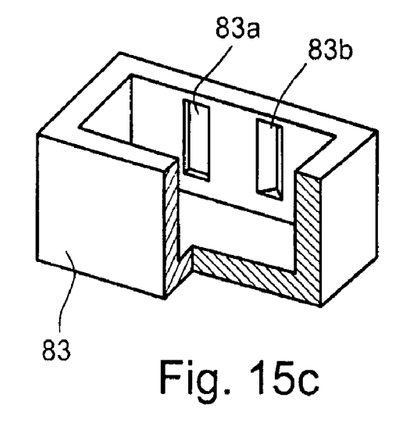
Figure 15D:
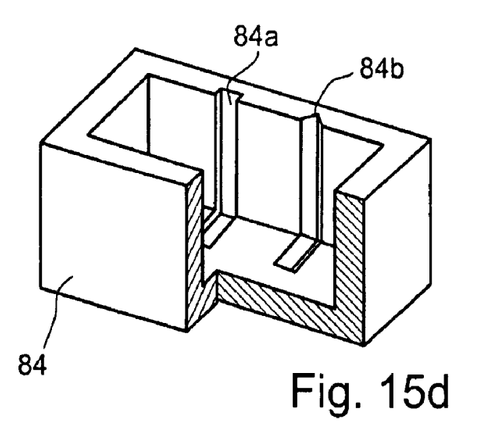
Figure 15E:
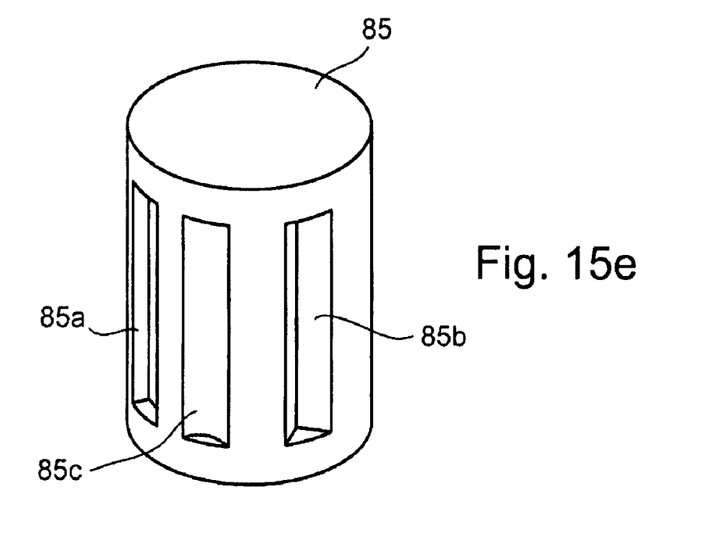

FIGS. 15a-15e illustrate still further examples of cutting operations capable of being performed by using a milling head constructed as described above. Thus, FIG. 15a illustrates the workpiece 81 formed with sharp internal corners 81a; FIG. 15b illustrates the workpiece 82 formed with internal corners 82a having flat or curved transitions; FIG. 15c illustrates a workpiece 83 formed with closed slots 83a of rectangular configuration and closed slots 83b of V-configuration having sharp internal corners; FIG. 15d illustrates a workpiece 85 formed with sharply-cornered open slots of rectangular configuration 84a and V-configuration 84b; and FIG. 15e illustrates a solid cylindrical workpiece 85 formed on its outer surface with sharply-cornered slots 85a of rectangular configuration, sharply-cornered slots 85b of V-configuration, and rounded surface slots 85c.

While the invention has been described with respect to several preferred embodiments, it will be appreciated that many other variations and modifications may be made. For example, the milling head could include a case which mounts more than one conical cutter members, e.g. two at opposite corners, or four at all four corners, when a hexahedral case is used. Also, the case could be of other configurations, for example cylindrical, oval, triangular, etc. In addition, other coupling means can be provided, such as friction-type coupling devices, for coupling the conical cutter member to the rotary shaft. The milling head could also be embodied as a kit including cutter members of different types (e.g. sharply-pointed, rounded, etc.) as well as of different dimensions, to enable the user to select the appropriate cutter member for the particular milling operation to be performed.

Many other variations, modifications and applications of the invention will be apparent.

What is claimed is:

1. An attachment for a milling machine head having a longitudinal axis about which a cutting tool is normally rotated when working a workpiece, said attachment comprising:
   a coupling sleeve attachable to the milling machine head with the longitudinal axis of the coupling sleeve coaxial to said longitudinal axis of the milling machine head;
   a rotary cutter member within said coupling sleeve and rotatable with respect thereto about a rotary axis which is at a predetermined angle with respect to said longitudinal axis of the milling machine head;
   a shaft within said coupling sleeve and coupleable at one end to said milling machine head so as to be coaxial to said longitudinal axis of the milling machine head;
   a first bevel gear carried at the opposite end of said shaft;
   and a second bevel gear carried by said rotary cutter member and engageable with said first bevel gear to rotate said cutter member about the rotary axis at said predetermined angle with respect to said longitudinal axis of the milling machine head.

2. The attachment according to claim 1, wherein said coupling sleeve, when attached to the milling machine head, is rotatable with respect thereto so as to permit angular adjustment of the coupling sleeve, and thereby of the rotary axis of the rotary cutter member, around said longitudinal axis of the milling machine head.

3. The attachment according to claim 2, wherein said coupling sleeve includes an opening in a side wall thereof with which said rotary cutter member is aligned.

4. The attachment according to claim 3, wherein said predetermined angle of the rotary axis of said rotary cutter member with respect to the longitudinal axis of the milling machine head is substantially 55°.

5. The attachment according to claim 1, wherein said rotary cutter member is a conical cutter member.

6. The attachment according to claim 5, wherein said conical cutter member defines a cone angle of substantially 70°.

7. The attachment according to claim 6, wherein said predetermined angle of the rotary axis of said conical member, with respect to said longitudinal axis of the milling machine head, is substantially 55°.

8. The attachment according to claim 6, wherein said conical cutter member has a pointed apex.

9. The attachment according to claim 6, wherein said conical cutter member has a rounded apex.

10. The attachment according to claim 1, wherein said coupling sleeve includes a spline projecting from its outer surface and receivable within a groove formed in a workpiece (a) to guide the movement of said rotary cutter member parallel to said longitudinal axis of the milling machine head, and (b) to prevent rotation of the coupling sleeve when the rotary cutter member is moved out of contact with said workpiece.

11. The attachment according to claim 10, wherein said rotary cutter member is conical and is formed with a pointed apex, and said spline is aligned with said apex of the conical cutter member.

12. The attachment according to claim 1, wherein said coupling sleeve further includes a bottom wall, and at least one leg projecting outwardly of said bottom wall, said leg having a flat outer surface such that said leg is effective (a) to guide the movement of said conical cutter member parallel to said longitudinal axis of the milling machine head, (b) to prevent rotation of the coupling sleeve when the conical cutter member is out of contact with a workpiece, and (c) to facilitate locating said conical cutter member when moved into contact with said workpiece.

13. The attachment according to claim 12, wherein said leg is located adjacent to a corner defined by a juncture of said side and bottom walls of the coupling sleeve.

14. The attachment according to claim 12, wherein said coupling sleeve includes a second leg projecting outwardly of said bottom wall and located adjacent to an opposite corner defined by another juncture of said side and bottom walls of the coupling sleeve.

15. The attachment according to claim 1, wherein said coupling sleeve includes an adjustable guide projecting laterally of a side wall of the coupling sleeve and engageable with a surface of the workpiece for guiding the movement of the rotary cutter member with respect to a workpiece.

16. The attachment according to claim 15, wherein said adjustable guide is carried by an external surface of said coupling sleeve and is engageable with an external surface of the workpiece to guide the movement of the rotary cutter member with respect to the workpiece.

17. The attachment according to claim 15, wherein said adjustable guide is adjustable with respect to a mounting member carried by said coupling sleeve.

18. The attachment according to claim 1, wherein said coupling sleeve is attachable to a fixed member of the milling machine head by a mounting assembly which permits angular adjustment of the coupling sleeve with respect to said fixed member of the milling machine head.

19. The attachment according to claim 18, wherein said mounting assembly comprises:
   a mounting ring mountable to said fixed member and alignably adjustable with respect thereto;
   a rotatable disc carrying said coupling sleeve; and
   a mechanical coupling between said disc and said mounting ring to permit angular adjustment of said rotatable disc and coupling sleeve with respect to said fixed member of the milling machine head.

20. An attachment for a milling machine head having a longitudinal axis about which a cutting tool is normally rotated when working a workpiece, said attachment comprising:
   a coupling sleeve attachable to the milling machine head with the longitudinal axis of the coupling sleeve coaxial to said longitudinal axis of the milling machine head;
   a rotary cutter member within said coupling sleeve and rotatable with respect thereto about a rotary axis which is at a predetermined angle with respect to said longitudinal axis of the milling machine head;
   said coupling sleeve including an opening in a side wall thereof with which said rotary cutter member is aligned.

21. The attachment according to claim 20, wherein said rotary cutter member is a conical cutter member and has an apex locatable to be substantially flush with the outer surface of said side wall.

22. The attachment according to claim 21, wherein said conical cutter member is adjustably mounted with respect to said coupling sleeve so as to permit the apex of the conical cutter member to be projected a desired distance through said opening in the sidewall of the coupling sleeve.

23. The attachment according to claim 21, wherein said coupling sleeve is of cylindrical configuration.

24. The attachment according to claim 20, wherein said coupling sleeve side wall is of polygonal configuration, and said opening with which the rotary cutter member is aligned is at a juncture of two sides of said polygonal side wall.

25. The attachment according to claim 24, wherein said coupling sleeve includes an end wall, and said opening with which the rotary cutter member is aligned is at the juncture of said two sides of the polygonal side wall and said end wall.

26. The attachment according to claim 24, wherein said cutter member is a conical member having an apex located or locatable to be flush with the outer surface of said side wall of the coupling sleeve at said juncture, such that said coupling sleeve enables the conical cutter member to cut a sharp interior corner in a workpiece.

27. The attachment according to claim 26, wherein said conical cutter member is adjustably mounted with respect to said coupling sleeve to permit the apex of the conical cutter member to be projected a desired distance through said opening in the coupling sleeve.

28. An attachment for a milling machine head having a longitudinal axis about which a cutting tool is normally rotated when working a workpiece, said attachment comprising:
   a shaft attachable at one end to the milling machine head with the longitudinal axis of the shaft coaxial with said longitudinal axis of the milling machine head;
   a first bevel gear at the opposite end of said shaft;
   and a conical cutter member carried by said attachment and rotatable about a rotary axis which is at a predetermined angle with respect to said longitudinal axis of the shaft;
   said cutter member including a second bevel gear engageable with said first bevel gear for rotating said cutter member about the rotary axis of said predetermined angle with respect to said longitudinal axis of the milling machine head.

29. The attachment according to claim 28, wherein said predetermined angle is substantially 55°, and said conical cutter member defines a cone angle of substantially 70°.

30. The attachment according to claim 29, wherein said conical cutter member has a pointed apex.

31. The attachment according to claim 29, wherein said conical cutter member has a rounded apex.

* * * * *